(12) United States Patent
Qi et al.

(10) Patent No.: US 10,706,708 B2
(45) Date of Patent: Jul. 7, 2020

(54) SYSTEMS AND METHODS DETECTING USE OF MOUNTED PHONES IN MOTOR VEHICLES

(71) Applicant: TRUEMOTION, INC., Boston, MA (US)

(72) Inventors: Yuting Qi, Lexington, MA (US); John Collins, Arlington, MA (US); Rafi Finegold, Sharon, MA (US)

(73) Assignee: TRUEMOTION, INC., Boston, MA (US)

( * ) Notice: Subject to any disclaimer, the term of this patent is extended or adjusted under 35 U.S.C. 154(b) by 0 days.

(21) Appl. No.: 16/569,189

(22) Filed: Sep. 12, 2019

(65) Prior Publication Data

US 2020/0090488 A1  Mar. 19, 2020

Related U.S. Application Data

(60) Provisional application No. 62/732,358, filed on Sep. 17, 2018.

(51) Int. Cl.
| | |
|---|---|
| G08B 21/18 | (2006.01) |
| G08B 5/22 | (2006.01) |
| H04M 1/725 | (2006.01) |

(52) U.S. Cl.
CPC ............ *G08B 21/182* (2013.01); *G08B 5/22* (2013.01); *H04M 1/725* (2013.01); *H04M 2250/12* (2013.01)

(58) Field of Classification Search
CPC .................................................. G08B 21/182
See application file for complete search history.

(56) References Cited

U.S. PATENT DOCUMENTS

| | | | | |
|---|---|---|---|---|
| 9,472,188 | B1 * | 10/2016 | Ouimette | G10L 17/26 |
| 2009/0262074 | A1 * | 10/2009 | Nasiri | A63F 13/06 |
| | | | | 345/158 |
| 2011/0045865 | A1 * | 2/2011 | Viering | H04W 52/325 |
| | | | | 455/522 |

(Continued)

OTHER PUBLICATIONS

Elhoushi, et al., "A Survey on Approaches of Motion Mode Recognition Using Sensors", IEEE Transactions on Intelligent Transportation Systems, vol. 18, No. 7, Jul. 1, 2017, pp. 1662-1686.

(Continued)

*Primary Examiner* — Hsinchun Liao
(74) *Attorney, Agent, or Firm* — Kilpatrick Townsend & Stockton LLP

(57) ABSTRACT

Methods and systems are disclosed for detecting physical interaction with an electronic device. Gyroscopic data may be received from gyroscopic sensors incorporated within the electronic device. A set of frequency bands may be defined for each axis of the plurality of axes. A frequency in which each value of the gyroscopic data is included in the gyroscopic data may be determined. The values associated with each frequency of a frequency band may be aggregated to generate a magnitude for the frequency band. A probability may be determined using the modified magnitude associated with each frequency band. If the probability exceeds a threshold then an indication that the user is physically interacting with the electronic device may be transmitted to a remote device.

21 Claims, 10 Drawing Sheets

(56) References Cited

U.S. PATENT DOCUMENTS

2013/0194308 A1\* 8/2013 Privault .................. G06T 11/60
                                                    345/650
2015/0161386 A1\* 6/2015 Gupta ................. G06F 11/3612
                                                    726/23
2016/0205238 A1    7/2016 Abramson et al.
2016/0337133 A1\* 11/2016 Yiu ....................... H04L 9/3268

OTHER PUBLICATIONS

EP19197700.8, "Extended European Search Report", dated Mar. 16, 2020, 12 pages.

\* cited by examiner

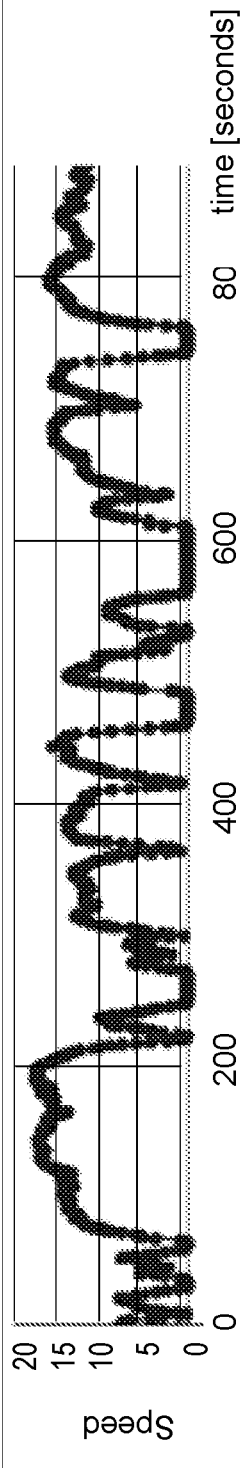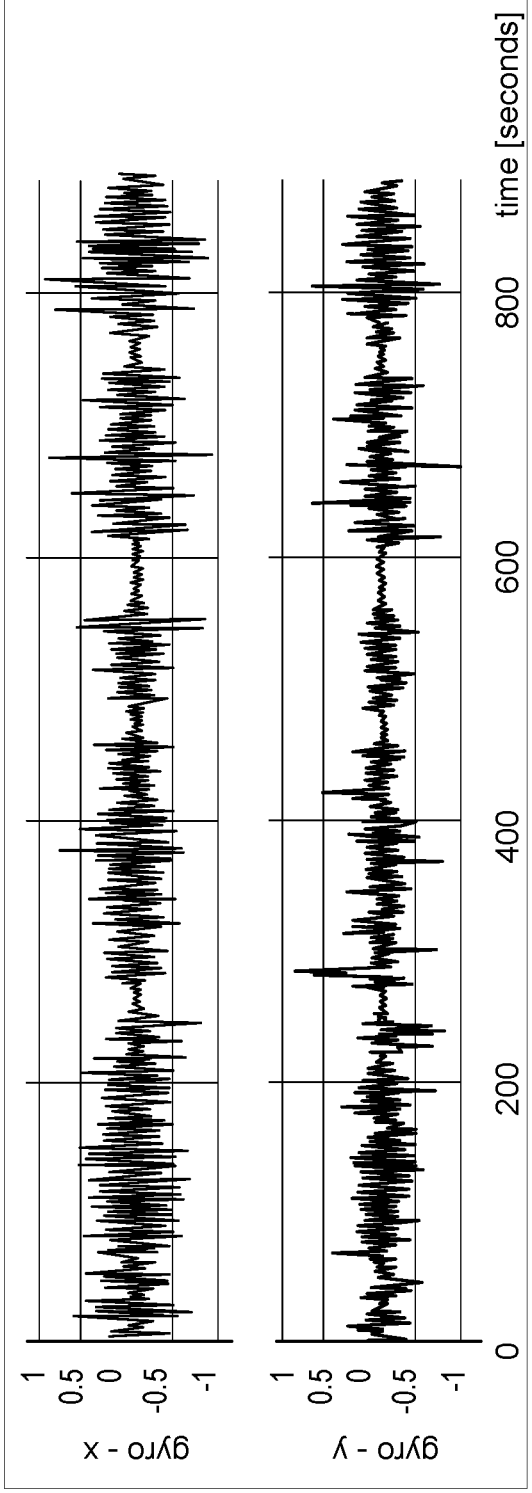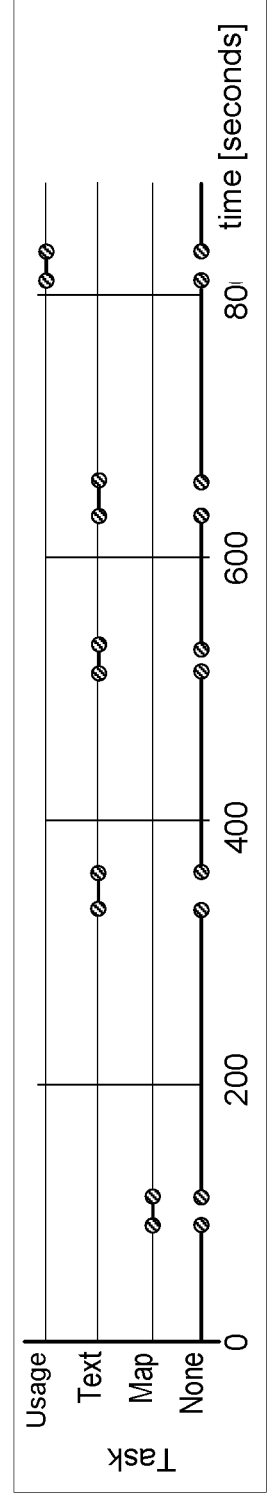

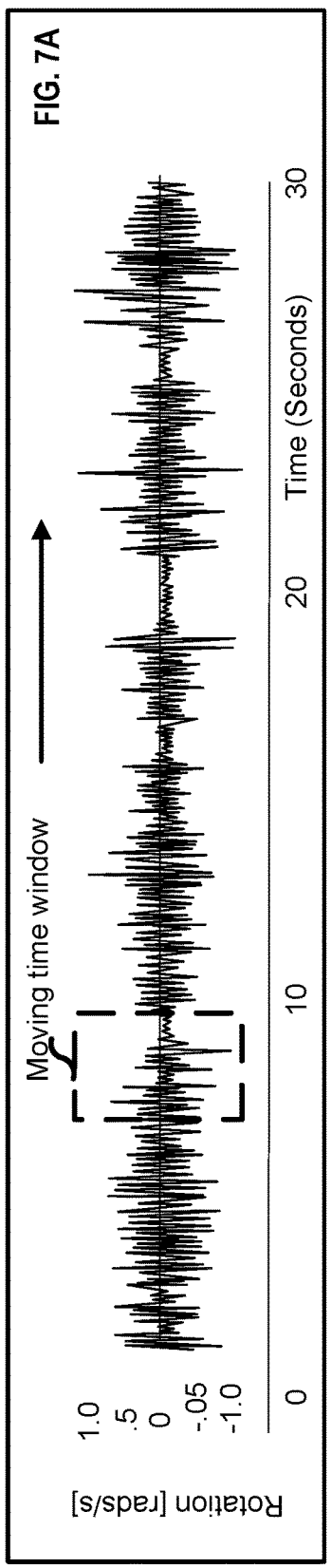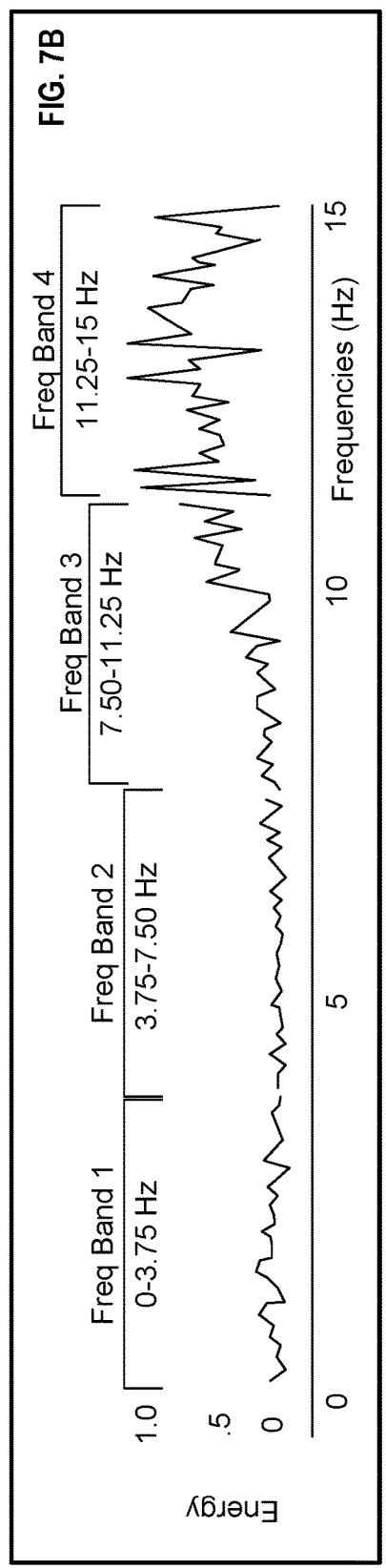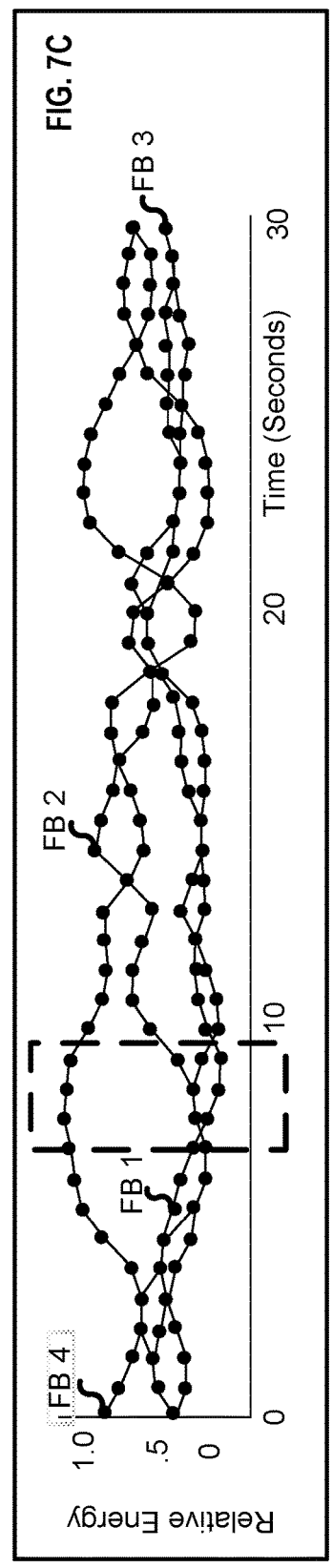

SYSTEMS AND METHODS DETECTING USE OF MOUNTED PHONES IN MOTOR VEHICLES

CROSS-REFERENCES TO RELATED APPLICATIONS

This application is a non-provisional of and claims the benefit and priority under 35 U.S.C. 119(e) of U.S. Provisional Application No. 62/732,358, filed Sep. 17, 2018, entitled "SYSTEMS AND METHODS DETECTING USE OF MOUNTED PHONES IN MOTOR VEHICLES", the entire contents of which are incorporated herein by reference for all purposes.

TECHNICAL FIELD

This disclosure generally relates to detecting the use of mobile devices, and more particularly, to detecting the use of mobile devices while in motion.

BACKGROUND

Distracted driving is dangerous not just for the driver, but for passengers and other people on the road. As users interact with more services available by mobile devices, users may be more likely to become distracted while driving. Users may even get distracted using services designed for use in vehicles like Global Positioning system (GPS) when the interaction occurs while the vehicle is in motion.

Despite the progress made in relation to providing data related to drivers and their vehicles, there is a need in the art for improved methods and systems related to detecting user interaction with mobile devices while in motion.

SUMMARY

Embodiments of the present invention relate mobile systems. More particularly, embodiments of the present invention relate to detection of interaction with mobile devices, such as mobile devices that are in a mounted configuration, within a motor vehicle. In some examples, methods related to determination of physical interaction with mobile devices using a gyroscope are provided.

According to some embodiments, a method is provided. The method comprises receiving gyroscopic data from one or more gyroscopic sensors incorporated within an electronic device, the gyroscopic data including a set of values corresponding to measurements output from each of the one or more gyroscopic sensors, each measurement being relative to at least one axis of a plurality of axes; determining a frequency composition from the set of values for at least one of the plurality of axes; defining a set of frequency bands for the at least one axis of the plurality of axes based on the frequency composition, wherein each frequency band of the set of frequency bands represents a portion of the frequency composition; calculating, for each frequency band of the set of frequency bands, a relative magnitude of an energy value associated with the portion of the frequency composition represented by the frequency band; generating an input for a classifier model, the input including the relative magnitude corresponding to each frequency band of the set of frequency bands and one or more ancillary data values; receiving an output from the classifier model in response to the input, the output including a probability value indicating a probability that a user is physically interacting with the electronic device; determining that the probability value exceeds a threshold; and transmitting, in response to determining that the probability value exceeds the threshold, an indication that the user is physically interacting with the electronic device to a remote device.

According to some embodiments, a system is provided. The system comprises: one or more processors; one or more gyroscopic sensors; and a non-transitory computer-readable medium storing instructions which when executed by the one or more processors, cause the one or more processors to perform operations including: receiving gyroscopic data from one or more gyroscopic sensors incorporated within an electronic device, the gyroscopic data including a set of values corresponding to measurements output from each of the one or more gyroscopic sensors, each measurement being relative to at least one axis of a plurality of axes; determining a frequency composition from the set of values for at least one of the plurality of axes; defining a set of frequency bands for the at least one axis of the plurality of axes based on the frequency composition, wherein each frequency band of the set of frequency bands represents a portion of the frequency composition; calculating, for each frequency band of the set of frequency bands, a relative magnitude of an energy value associated with the portion of the frequency composition represented by the frequency band; generating an input for a classifier model, the input including the relative magnitude corresponding to each frequency band of the set of frequency bands and one or more ancillary data values; receiving an output from the classifier model in response to the input, the output including a probability value indicating a probability that a user is physically interacting with the electronic device; determining that the probability value exceeds a threshold; and transmitting, in response to determining that the probability value exceeds the threshold, an indication that the user is physically interacting with the electronic device to a remote device.

According to some embodiments, a non-transitory computer-readable medium is provided. The non-transitory computer-readable medium storing instructions which when executed by the one or more processors, cause the one or more processors to perform operations including: receiving gyroscopic data from one or more gyroscopic sensors incorporated within an electronic device, the gyroscopic data including a set of values corresponding to measurements output from each of the one or more gyroscopic sensors, each measurement being relative to at least one axis of a plurality of axes; determining a frequency composition from the set of values for at least one of the plurality of axes; defining a set of frequency bands for the at least one axis of the plurality of axes based on the frequency composition, wherein each frequency band of the set of frequency bands represents a portion of the frequency composition; calculating, for each frequency band of the set of frequency bands, a relative magnitude of an energy value associated with the portion of the frequency composition represented by the frequency band; generating an input for a classifier model, the input including the relative magnitude corresponding to each frequency band of the set of frequency bands and one or more ancillary data values; receiving an output from the classifier model in response to the input, the output including a probability value indicating a probability that a user is physically interacting with the electronic device; determining that the probability value exceeds a threshold; and transmitting, in response to determining that the probability value exceeds the threshold, an indication that the user is physically interacting with the electronic device to a remote device.

Numerous benefits are achieved by way of the present invention over conventional techniques. For example, embodiments of the present invention detect physical interaction with mounted mobile devices without relying on the explicit information provided by the devices' operating system. Reflexive action may be executed in response to detecting physical interaction to reduce distraction and prevent future physical interaction with a mobile device. Detecting physical interactions may additionally or alternative modify sampling rates to refine future detections and/or other types of interactions.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Illustrative embodiments of the present invention are described in detail below with reference to the following drawing figures:

FIG. 5A is an exemplary depiction of representations of gyroscopic data used to detect physical interaction according to some embodiments.

FIG. 5B is an exemplary depiction of representations of gyroscopic data used to detect physical interaction according to some embodiments.

FIG. 5C is an exemplary depiction of representations of gyroscopic data used to detect physical interaction according to some embodiments.

FIG. 7A is an exemplary depiction processing gyroscopic data to determine an occurrence of physical interaction according to some embodiments.

FIG. 7B is an exemplary depiction processing gyroscopic data to determine an occurrence of physical interaction according to some embodiments.

FIG. 7C is an exemplary depiction processing gyroscopic data to determine an occurrence of physical interaction according to some embodiments.

Figure 1:
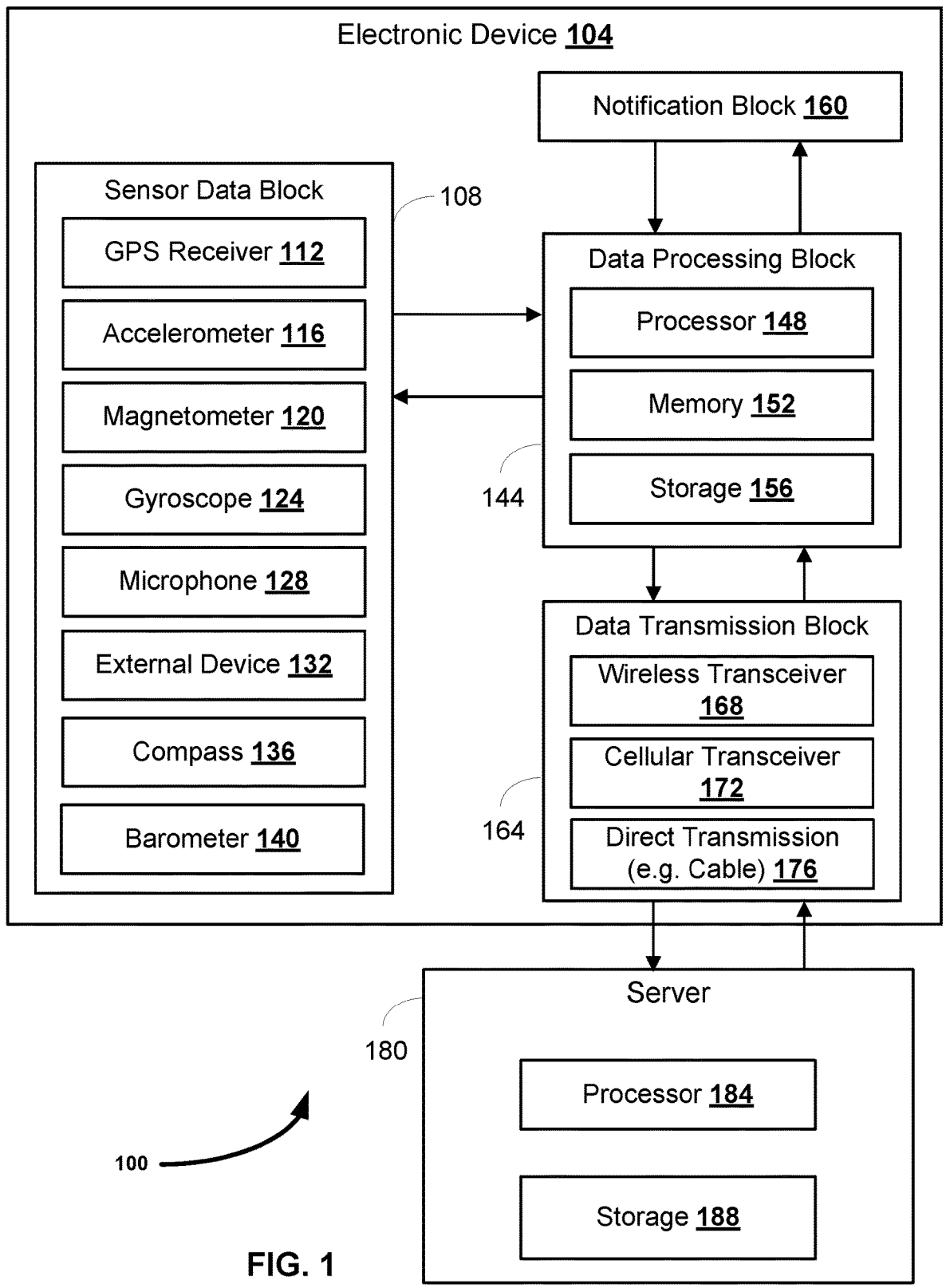
FIG. 1 depicts an exemplary block diagram illustrating the sensor and processing components of a mobile device for which mounted usage may be detected according to some embodiments.

In the appended figures, similar components and/or features may have the same reference label. Where the reference label is used in the specification, the description is applicable to any one of the similar components having the same reference label.

DETAILED DESCRIPTION

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Distracted driving through the use of a mobile device can be dangerous for the driver, passengers, and people nearby. Together with other factors, detecting physical interaction between a user and a mounted mobile device may provide an inference that a user of the mobile device (e.g., a driver) may be distracted during a particular task. As used herein, "physical interaction" may refer to any user interaction with a device including, but not limited to, tapping a surface of the device, providing an input (e.g., through an interface), moving the device, and/or the like. For example, detecting a physical interaction with the device while device is moving above a particular speed may indicate that the mobile device is being operated while in a vehicle and possibly while driving. One or more actions may be executed as a result of the detection such as, and by example only, preventing one or more functions of the mobile device, increasing a sampling rate for a more accurate detection, transmitting an alert to the mobile device or to a server, and/or the like. Detecting physical interaction with the mobile device may enable the mobile device or a server to prevent further distractions and return a user's focus to the task.

Some methods and system detect user interactions with a mobile device by examining integrated sensor data to detect coarse movements of a mobile device, such as picking up the mobile device, moving the mobile device about while making a phone call or sending a text message, and so on. When the mobile device is in a mounted configuration, user interaction with the device (e.g., tapping the surface of the device, generating user input through an interface, etc.) may not be detectable due to the lack of course movements.

As described herein, manual interaction with a mounted electronic device is frequently referred to as "tapping", and its detection referred to as "tap detection". These terms should be understood to include all types of manual interaction with a mounted device, including actions typically referred to as "swiping", "dragging", "typing", and the like.

In some examples, the detection of manual interaction may be provided by an operating system or other software application of the mobile device. For example, the operating system may detect network traffic being transmitted from and/or to the device and make a determination that the mobile device is in-use when the network traffic increases by more than a threshold amount. Other software applications executing on the device my detect an interaction such as, for example, in response to a user making a selection. In other examples, detecting physical device interaction may be challenging such as interactions that do not provide a level of interaction with any particular software application. For example, a user may attempt to interact with the mobile device without directly interacting with any application such as tapping on the mobile device to activate a display. For another example, users may interact with an application that does not record or report the interaction. For yet another example, the physical interaction may not generate a measurable change in a measurable aspect of the device (e.g., network traffic, processor cycles, input/output requests, and/or the like). Subtle features detected using gyroscopic and/or other sensors embedded in the device may yield reliable detections.

Methods and system are disclosed herein for detecting physical interactions with mounted mobile devices. Gyroscopic data may be received from gyroscopic sensors within a mobile device over a period of time (e.g., three seconds windows). The gyroscopic data may output a plurality of measurement values each being a measurement of the angular velocity relative to one or more of a plurality of axes. For example, one or more measurement values may be measured relative to a horizontal axis (e.g., the x-axis being horizontal relative to an orientation of the mobile device), one or more measurement values may be measured relative to a vertical axis (e.g., the y-axis being vertical relative to an orientation of the mobile device), and/or one or more measurement values may be measured relative to a depth axis (e.g., the z-axis being depth relative to an orientation of the mobile device). The measurement values indicate a measured angular velocity relative to a respective axis of the plurality of axes.

The measurement values translated into a frequency composition. For example, the measurement values may be translated into the frequency domain using a Fourier transform. A set of frequency bands (e.g., categories) for each axis may be defined (e.g., 0-6 Hz, 6-12 Hz, 12-19 Hz, 19-25 Hz, etc.) to organize the measurement values by frequency. A magnitude of the relative energy of the measurement values of each frequency band may be determined. The magnitude of each frequency band may be combined with ancillary data (e.g., a speed of the mobile device, etc.) and input into a classifier model (e.g., a machine-learning model). The classifier model outputs probability values (e.g., one or more probability values per input) corresponding to a probability at a given time interval in which a user is physically interacting with the mobile device. The output of the classifier model over time (e.g., an aggregated plurality of probability values) may be further refined using a smoothing algorithm (e.g., N-second smoothing kernel) to inhibit outlier values.

The smoothed probability values may be used to determine at a given point-in-time (or discrete time interval), whether a user is interacting with the mounted device. If the probability values associated with the point-in-time exceeds a threshold, then it may be determined that a user is likely physically interacting with the mounted device. In response to determining physical interaction with the mounted device, the mounted device may transmit an indication of physical interaction to a remote device (e.g., a server, another mobile device, etc.). In some examples, in addition to transmitting the indication, one or more actions may be executed by the mounted device. For example, the device may disable one or more features or applications such as an application currently receiving input by a user or trigger a sensory output (e.g., vibration, audible alert, etc.). This may reduce the distraction to the user and to free available processing resources. In some examples, the mobile device may increase a sampling rate or other factors used to determine physical interaction in order to increase the accuracy of the determination. In other examples, the mobile device may decrease the sampling rate to increase a rate in which a physical interaction determination may be completed. Other such functions may be performed by the mobile device, a server device, or any other device, in response to detecting an indication of physical interaction with the mounted device without departing from the spirit or scope of the present disclosure.

FIG. 1 is a system diagram illustrating a system 100 for measuring device acceleration and detecting physical interaction according to some embodiments. System 100 includes an electronic device 104 which includes a plurality of processing, sensor, and communication resource components. Electronic device 104 may include a sensor data block 108, a data processing block 144, a data transmission block 164, and optionally a notification block 160. The sensor data block 108 includes data collection sensors as well as the data collected from sensors that is available to electronic device 104. This can include external devices connected via Bluetooth, USB cable, etc. The data processing block 144 may include storage 156 which may include data from the sensors of the sensor data block 108 processed by processor 122. This may include, but is not limited to, analyzing, characterizing, manipulating, smoothing, subsampling, filtering, reformatting, etc.

Data transmission block 164 may process communications (e.g., transmitted and received communications) such as the processed sensor data transmitted to an external computing device (e.g., server 180). The external computing device may also store and/or process the data obtained from sensor data block 108. Server 180 may include its own processor 184 and storage 188.

Notification block 160 may report the results of analysis of sensor data performed by the data processing block 144 to a user of the electronic device 104 via a display (not shown). For example, notification block 160 may display or otherwise present a warning communication to a user of the electronic device 104 upon determining that that the user may be a distracted driver. In some examples, the physical interaction determination may be a process executed by processor 148 of electronic device 104. In other examples, the physical interaction determination may be a process executed by server 184, as described further herein with respect to FIG. 2.

Some embodiments are described using examples where driving data is collected using electronic devices 104, and these examples are not limited to any particular electronic device. As examples, a variety of electronic devices including sensors such as location determination systems such as global positioning system (GPS) receivers 112, accelerometers 116, magnetometers 120, gyroscopes 124, microphones 128, external (sensor) devices 132, compasses 136, barometers 140, communications capabilities, and the like may be included or connected to electronic device 104. Exemplary electronic devices include smart watches, fitness monitors, Bluetooth headsets, tablets, laptop computers, smart phones, music players, movement analysis devices, and the like.

One or more sensors of electronic device 104 (e.g., the sensors of sensor data block 108) may be operated to collect measurements to provide an indication as to physical interaction with the electronic device 104. In some examples, the measurements may be collected at time when electronic device is likely to be with the driver when operating a vehicle, such as when the device is moving with a particular speed or when the device is located on a known road (e.g., a highway). The sensors used to collect data may be components of the electronic device 104, and use power resources available to electronic device 104 components, e.g., mobile device battery power and/or a data source external to electronic device 104.

In some examples, settings of a mobile device may be used to enable different functions described herein. For example, in Apple iOS, and/or Android OS, having certain settings enabled can enable certain functions of embodiments. In some examples, having location services enabled allows the collection of location information from the mobile device (e.g., collected by global positioning system (GPS) receiver 112), and enabling background app refresh allows some embodiments to execute in the background, collecting and analyzing driving data even when the application is not executing. In some implementations, alerts are provided or surfaced using notification block 160 while the app is running in the background since the physical can be performed in the background.

Figure 2:
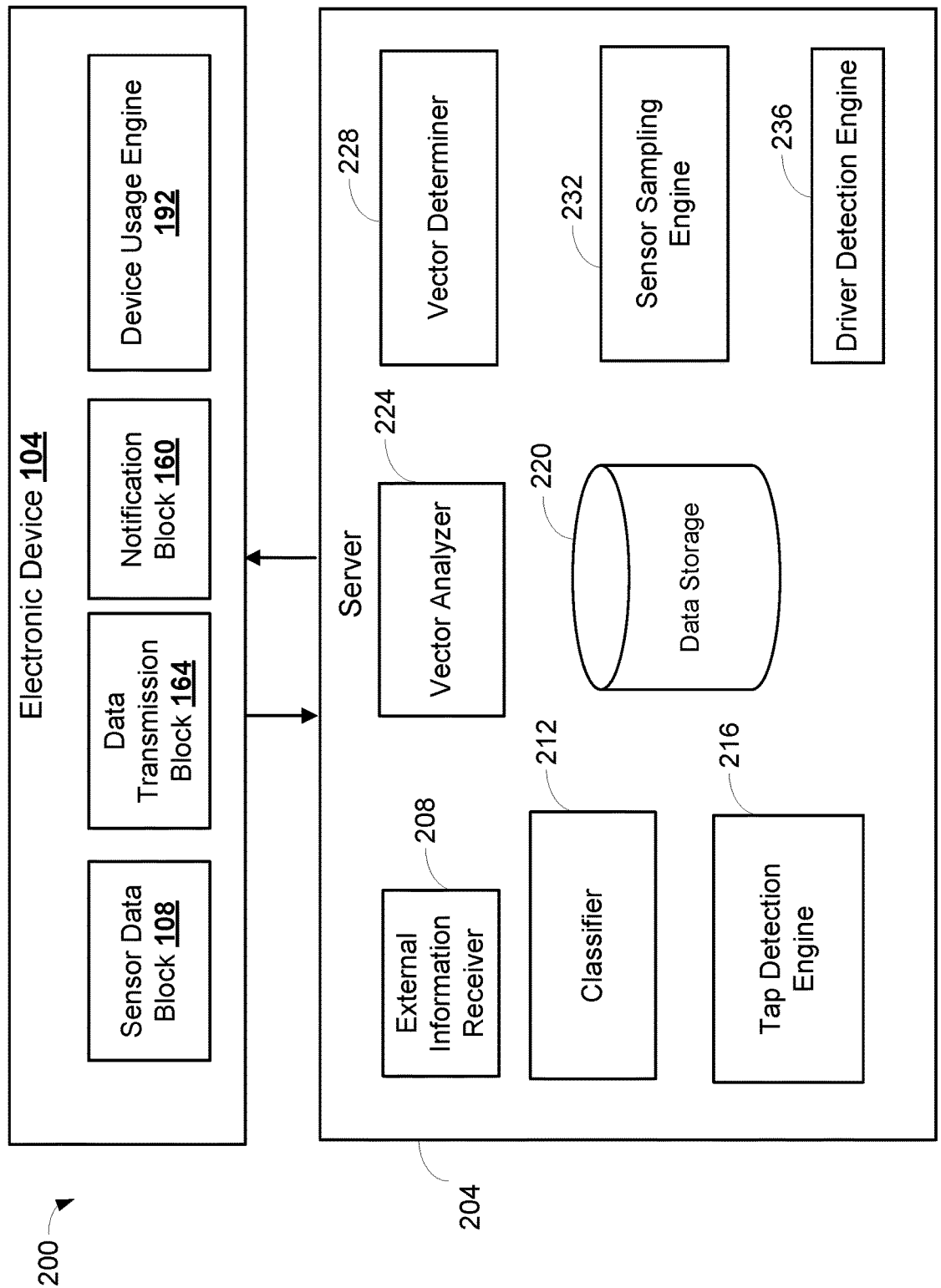
FIG. 2 depicts an exemplary block diagram of a server system for collecting driving data according to some embodiments.

FIG. 2 shows a system 200 for collecting driving data that can include a server 204 that communicates with electronic device 104. Server 204 may be the same or a different server than server 150 of FIG. 1. In some embodiments, server 204 may provide functionality using components including, but not limited to vector analyzer 224, vector determiner 228, external information receiver 208, classifier 212, sampling engine 232, driver detection engine 236, and a tap detection engine 216. These components may be executed by processors (not shown) in conjunction with memory (not shown). Server 204 may also include data storage 220. Further, although particular components and functions are shown as included within or executed by server 240, any particular component and/or function may also be included within or executed by electronic device 104, and vice versa.

The sensors of sensor data block 108 may be operated to collect measurements to provide an indication as to physical interaction with the electronic device 104. In some examples, the measurements may be collected at time when electronic device is likely to be with the driver when operating a vehicle, such as when the device is moving with a particular speed or when the device is located on a known road (e.g., a highway). The collected data may be analyzed (in real-time) to determine acceleration vectors for the electronic device 104. For example, upon determining that the electronic device is within a vehicle, driver detection engine 236 may apply one or more processes to the data to determine whether the user of the electronic device 104 is a driver of the vehicle. Other examples are processes to detect and classify driving features include physical interaction with the electronic device 104 using classifier 214, and determine acceleration vectors using vector analyzer 224 and vector determiner 228. In some embodiments, external data (e.g., weather) can be retrieved and correlated with collected driving data.

In some examples, server 204 may transform collected sensor data (e.g., collected using sensor data block 108) into different results, including, but not limited to, analysis and determination of tap detection 216. A determination that physical interaction with an electronic device may have occurred may trigger a communication via notification block 160 of electronic device 104. The tap detection engine 216 may be used to adjust the frequency of data collected by sensor data block 108 in some embodiments, as adjusted by data sensor sampling engine 232. Sensor sampling engine 232 may be in communication with electronic device 104 to cause the sensor data block 108 to collect data more frequently, less frequently, or at the same frequency based on a positive tap detection, a probably tap detection, or no tap detection (over a predetermined period of time).

Figure 3:
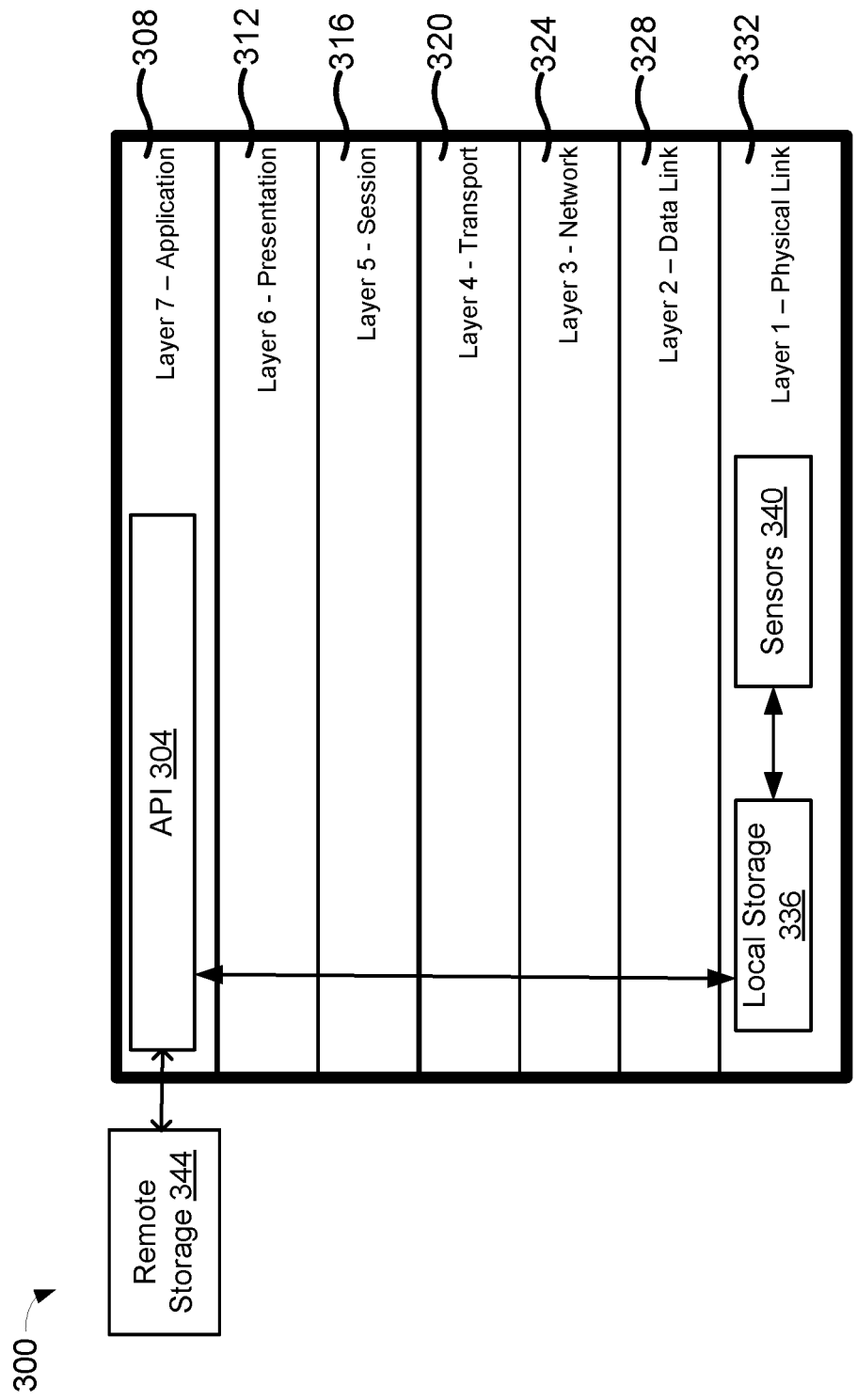
FIG. 3 is an exemplary block diagram of a protocol stack that may be implemented by a mobile device according to some embodiments.

FIG. 3 is an exemplary block diagram of a protocol stack 300 that may be implemented by the electronic device 104. The electronic device 104 may implement the protocol stack to communicate with any of the other systems described herein, such as the server 180 and/or the server 204. The protocol stack 300 may include one or more of seven layers depicted: an application layer 308, a presentation layer 312, a session layer 316, a transport layer 320, a network layer 324, a data link layer 328, and a physical link layer 332. Together, these seven layers may represent a model, such as an Open Systems Interconnection (OSI) model. The OSI model of FIG. 3 may characterize the communication functions of the described systems. Although shown and described as having seven layers, protocol stack 300 may include more or fewer layers to perform less, the same, or additional functions.

According to the OSI model, the application layer 307 may interact with a user (e.g., via receiving user inputs and presenting outputs) and software applications implementing a communication component. The application layer 307 may synchronize communication between systems and determine resource availability. The application layer 307 may be application-specific, in that the specific functions dependent on the particular application being executed by the electronic device 104.

Application layer 308 may execute an application programming interface (API) 304 which in turn may execute the processes some or all of the processes of FIG. 9. API 304 may be in communication with remote storage 344, such as storage 188 of server 180 or 156 of electronic device 104. In some embodiments, data collected by the sensors 340 may be stored in remote storage 344.

Presentation layer 312 may translate between application and network formats. Various applications and networks may implement different syntaxes and semantics. Thus, the presentation layer 312 may transform data from the network into a form that the application accepts. For example, communications transmitted between electronic device 104 and server 180 may be encoded and/or encrypted in a particular syntax that cannot be parsed by an application layer 308. Presentation layer 312, may decode/decrypt communications and convert the communication into a format that the application layer 308 can parse. Presentation layer 312 may also encode and/or encrypt communications of the application layer 308 that are to be transmitted over the network.

Session layer 316 may control connections between the systems (104, 180, 204, etc.) and other devices and/or servers, as described herein. Session layer 316 may establish the connections, manage the connections, and terminate the connections used to communicate between the devices.

Transport layer 320 may execute quality of service functions during transfers of data between devices. In some examples, transport layer 320 may provide error control, by for example, using checksums, parity bits, repeating bits and/or packets, etc. For example, transport layer 320 may track data being transmitted and re-transmit failed communications. In addition, transport layer 320 may provide an acknowledgment of successful data transmission and send the next data to be transmitted in a synchronous fashion if no errors occurred.

Network layer 324 may provide the means of transferring the data to and from the systems over a network. The source node and destination node of the systems may each have an address which permits the other to transfer data to it by providing the address with the data. Network layer 324 may also execute routing functions which may determine a path between a source node (e.g., electronic device, server, router, switch, etc.) and destination node and pass through zero or more other nodes.

Data link layer 328 may define and provide the link between a directly and physically connected source node and destination node. Data link layer 328 may further detect and correct errors occurring at physical link layer 332. In some examples, data link layer 328 may include two sublayers: a media access control (MAC) sublayer that may control how devices in the network gain access to data and gain permission to transmit it, and a logical link control (LLC) sublayer that may identify network layer 324 protocols and encapsulate them.

The physical link layer 332 may include one or more sensors 340 and local storage 336. Sensors 340 may include, for example, an accelerometer, a compass, a gyroscope, a magnetometer, a GPS, and/or the like. The physical link layer 332 may further includes one or more input devices (not shown), such as a keyboard, a mouse, a trackpad, a trackball, a touchscreen display, and/or any other device capable of receiving user input. The physical link layer 332 may further include local storage 336. In some examples, data collected by sensors 340 may be stored in local storage 336. Physical link layer 332 may define the electrical and physical specifications of the data by providing an electrical interface with sensors 340 and an application programming interface to enabling receiving, processing, and storing measurements received from sensors 340. For example, physical link layer 332 may cause sensors to provide measurements at a particular sampling rate and increase or decrease the sampling rate in real-time. Physical link layer 332 may provide a physical medium for storing unstructured raw data (e.g., raw electrical input from sensors 340) which may be received, processed, stored, transmitted, and/or the like.

Figure 4:
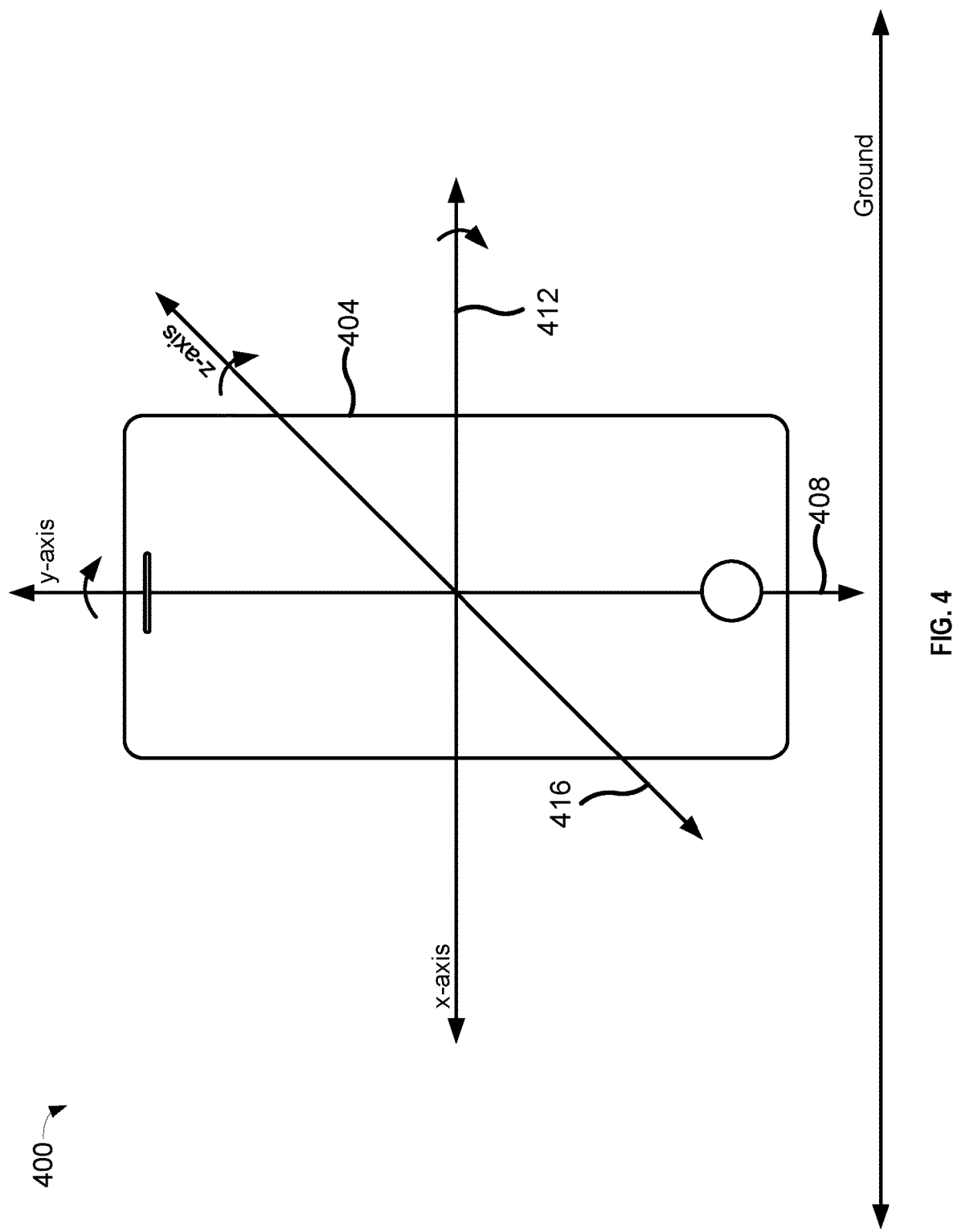
FIG. 4 is an exemplary depictions of an electronic device and axes corresponding to measured angular velocity according to some embodiments.

FIG. 4 depicts an exemplary representation 400 of the orientation of the principal axes of an electronic device (e.g., a smartphone 404). One or more gyroscopes within the electronic device measure the angular velocity (and/or angular acceleration) of the device relative to one or more of those axes. For example, a gyroscope sensor may record the rate of angular rotation around the x-axis 408, y-axis 412, and/or z-axis 416. A gyroscope may be used to measure the angular rotation around one or more axes.

FIGS. 5A-5C depict exemplary illustrations of data collected by sensors of an electronic device (such as electronic device 104 of FIG. 1) that may be processed to detect manual interaction with the electronic device. In some examples, the data may be processed in real-time, by the electronic device or a remote server, to detect the manual interaction. In other examples, the data may be collected for processing at a later time. For example, the data may be collected over a period a specified duration (e.g., 55 days) before being transmitted to a server for processing. The server may process the data to detect instances of physical interaction that occurred during the period of the specified duration. FIG. 5A depicts the speed at which the electronic device is moving (e.g., irrespective of direction). Speed may be determined using one or more disparate sensors that may be correlated to increase an accuracy of the speed value. For example, an accelerometer or gyroscope may be used to obtain a measurement value corresponding to the electronic device. The measurement value may be translated into a velocity value (e.g., a vector that includes both speed and direction) using an integral function. The accelerometer or gyroscopic data may be correlated with data from a GPS receiver. Although the electronic device may use GPS to determine a relative position of the electronic device (relative to one or more satellites), velocity may be determined by defining a rate in which the position is changing or by storing one or more position values over a period of time and translating those values into a velocity measurement using a derivative function.

The speed of the electronic device may be used to infer a traveling medium of the device. For example, if the device is moving at a high speed, then it is likely that the electronic device is located within an automobile. If the device is operating at a low speed (e.g., 2 m/s or less) than the device is likely being carried by a user who is walking or running. Speed may be correlated with other data, for example, position using a GPS receiver, to increase the accuracy of the determination that the user is traveling via an automobile. Further, other sensor data may be correlated with speed and/or GPS data to provide a determination as to whether the user is the driver of the vehicle (e.g., using driver detection engine 236 of FIG. 2). Speed measurements (and/or calculations or correlations) may be gathered over a period of time that is longer or the same as the period of time used to provide the tap detection determination. As depicted, the graphs of FIG. 5A-5C provide measurements over the same or similar time period (e.g., approximately 900 second), although this is not required by the present invention.

FIG. 5B depicts exemplary illustrations of measurements received from one or more gyroscopic sensors. In some examples, a gyroscopic sensor may provide a plurality of measurements relative to a plurality of axes, one measurement for each axis that is measured (e.g., x-axis, y-axis, and/or z-axis). In other examples, an electronic device may include a plurality of gyroscopic sensors, each sensor providing a measurement relative to a single axis (e.g., x, y, or z). Gyroscopes measure angular velocity relative to one or more axis, which, as noted above, may be used to determine an acceleration, velocity, and/or position of the electronic relative to one or more axes.

The graphs provide exemplary measurements of the angular velocity of a rectangular electronic device in a vertical orientation (e.g., the orientation represented by FIG. 4). FIG. 5A depicts measurements from gyro-x (e.g., a gyroscope measuring angular velocity relative to the x-axis) that may have larger magnitudes than the measurements from gyro-y (e.g., a gyroscope measuring angular velocity relative to the y-axis) depicted by FIG. 5B. A third gyroscope (gyro-z, not shown) may measure the angular velocity relative to the z-axis (e.g., 416 of FIG. 4). In some examples, the electronic device may be prone to larger variations of measured angular velocity relative to the x-axis in a vertical orientation upon a physical interaction. In other examples, the electronic device may be prone to larger variations of measured angular velocity relative to the y-axis in a horizontal orientation upon a physical interaction.

FIG. 5C depicts exemplary graph of data points indicating whether a physical interaction has occurred and the type of physical interaction that has occurred based on training data. FIG. 5C represents data training data that may be used to correlate gyroscopic data and speed data to identify aspects of the gyroscopic data and/or speed data that may be indicative of physical interaction with a device. For example, an electronic device may be a mobile device such as a smartphone and the physical interaction may relate to general usage, texting, using maps, or no interaction at all. In some examples, the graphs of FIG. 5A and FIG. 5B may include training data used to generate and/or train a machine-learning model for physical interaction detection. During each period of physical interaction, the physical interaction may cause variations in the measurements from the gyroscopes. The data points of each graph (e.g., speed, gyro-x, and gyro-y) may be correlated to provide a determination that a period of physical interaction (e.g., a task) is (contemporaneously) occurring and the type of task corresponding to the physical activity.

Figure 6A:
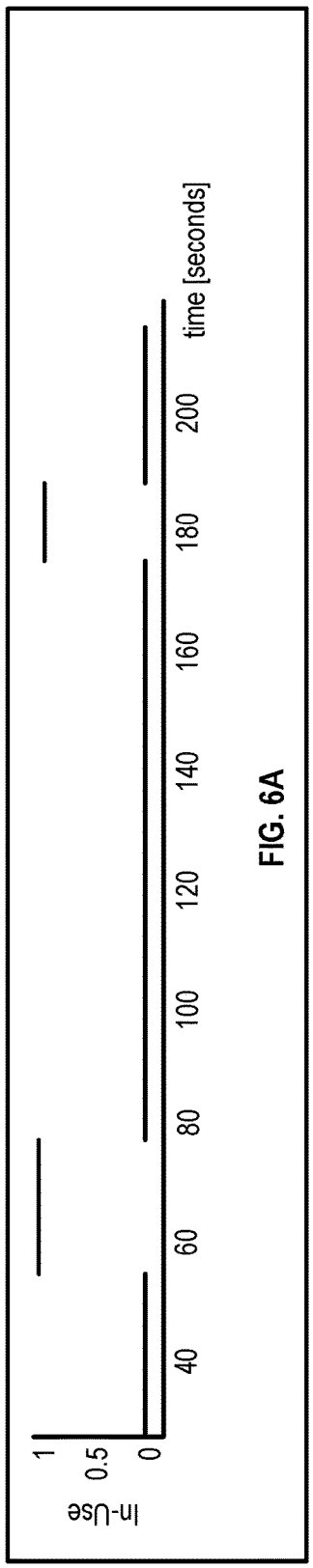
FIG. 6A is an exemplary depiction of gyroscopic data used to train a classifier model according to some embodiments.
Figure 6B:
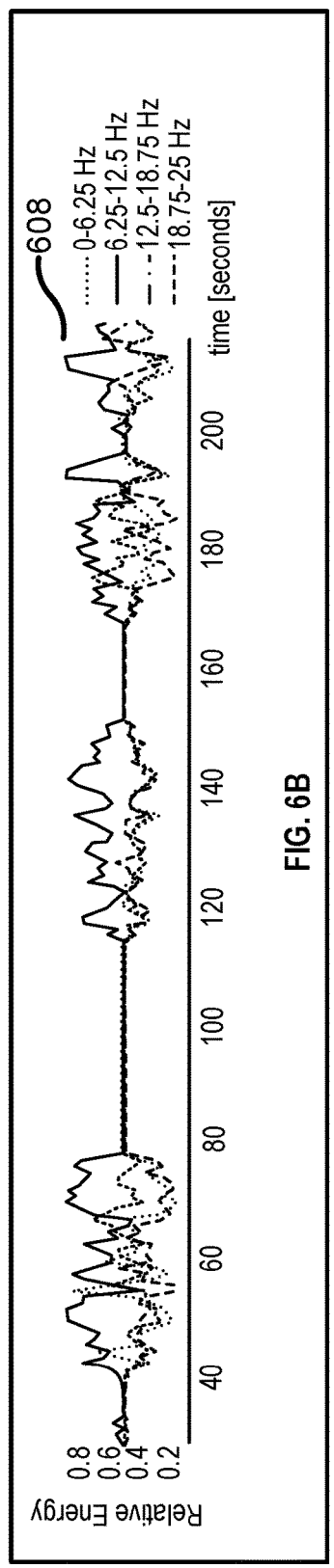
FIG. 6B is an exemplary depiction of gyroscopic data used to train a classifier model according to some embodiments.
Figure 6C:
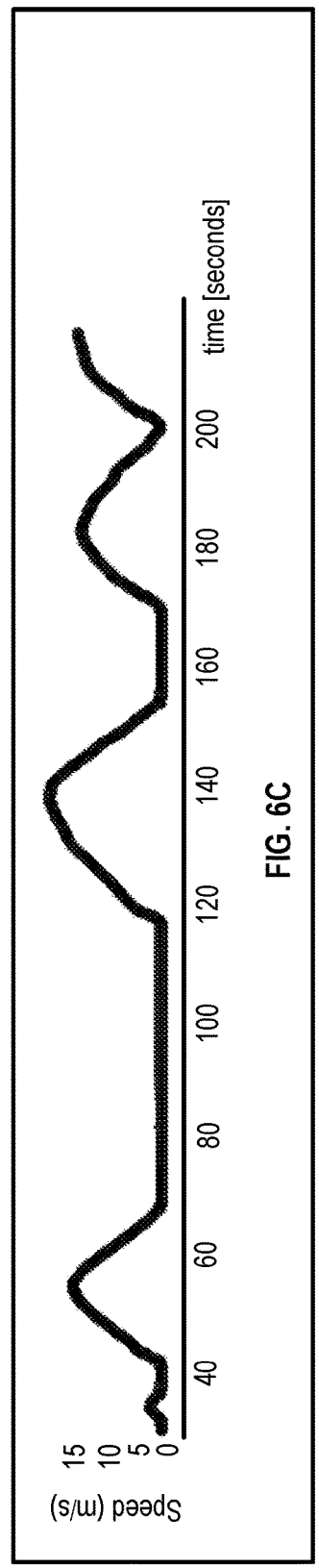
FIG. 6C is an exemplary depiction of gyroscopic data used to train a classifier model according to some embodiments.

FIG. 6A-6C depicts exemplary graphs of data collected and processed by the electronic device to determine a tap detection. The data presented in the graphs may be used to train a classifier model (e.g., the machine-learning model). FIG. 6A depicts an exemplary step graph indicating of periods of time in which the electronic device is in-use (e.g., a user is physically interacting with the electronic device) as input to the classifier model. FIG. 6B depicts an exemplary graph of the relative energy of particular frequency bands (e.g., generated in a manner similar to that described in connection with 708 of FIG. 7A below). FIG. 6C depicts an exemplary graph of the speed at which the electronic device is moving (e.g., based on the medium in which the user is traveling, such as, walking driving, passenger in a train or plane, etc.). Each of the graphs of FIG. 6A-FIG. 6C depict data gathered over the same period of time of 0-220 seconds. In some examples FIG. 6B and FIG. 6C may be used to predict whether the in-use data value is equal to zero (e.g., the electronic device is not in-use) or has a value equal to one (e.g., the electronic device is in-use). For example, the large variations in relative energy illustrated in FIG. 6B may be seen primarily when the electronic device is in-use. Taken alone, the time period from 120-155 seconds may be interpreted as in-use. By correlating the speed of the vehicle as illustrated in in FIG. 6C with the variations in relative energy illustrated in g in FIG. 6B, it is possible to distinguish between the relative energy that is associated with the physical interaction determination and the relative energy that is caused by the vehicle's movement.

The classifier model may receive the data associated with each of graphs FIG. 6A-6C in order to identify relationships among the data. The classifier model may correlate data values in FIG. 6B-6C that occur when the mobile device is in-use according to the graph depicted in FIG. 6A to determine particular frequencies (and speeds) that are more relevant physical interaction determination than other frequencies. For example, classifier model may identify the 6-12 Hz frequency band as having higher relative magnitude that coincides with the device being in-use. The classifier model may receive live data, identify a particular relative energy at the 6-12 Hz frequency band, and subsequently provide a probability that the physical interaction is occurring. The classifier model may provide re-evaluate each physical interaction determination to further increase the accuracy of each subsequent physical interaction determination. Thus, the classifier model may be trained using manufactured data and/or historical data first and subsequently refined using previous physical interaction determinations (e.g., using the manufactured data, historical data, or live data).

FIG. 7A-7C depict exemplary graphs illustrating received gyroscopic data that is processed into frequency bands. FIG. 7A depicts the rotation or angular velocity (in radians per second) measured by one or more gyroscopes over time. The length of the time period of which the data is collected may be predetermined, selected by a user, determined by the classifier model (e.g., the machine-learning model), of a fixed length, of a variable length, and/or the like. For example, the time period may be modified upon detecting a previous physical interaction in order to provide an ongoing physical interaction determination (e.g., lengthening the period of time) or to provide a more accurate physical interaction determination (e.g., shortening the period of time and/or increasing the gyroscope sampling rate).

A moving window may be of a particular duration (e.g., 3 seconds) and used to convert portions of the gyroscopic data into the frequency domain (e.g., graph depicted in FIG. 7B). The moving time window may be a predetermined interval (fixed or variable) that exists within the time period. For example, the length of the moving window may be user selected, selected by the classifier model based on a previous physical interaction determination (e.g., based on an ongoing physical interaction determination), increasing or decreasing an accuracy of the physical interaction determination as described above, or based on any other factor. The data represented by graph FIG. 7A may be processed (in part by using the moving window) to represent the magnitudes in terms of the frequency in which each magnitude appears in the window.

The moving window may be used to capture the frequencies at which each magnitude exists in the graph within the moving window (by using, for example, a spectral power function, a transform such as Laplace or Fourier, or the like). Particular frequency bands may be selected (predetermined or selected based on a refining process using data from a previous physical interaction determination). For example, the frequency bands may be selected by subtracting the highest frequency from the lowest frequency and dividing the result by an integer (e.g., N) to generate a particular number (e.g., N) frequency bands. Increasing the number of frequency bands may increase the accuracy of the data while decreasing the number of frequency bands may increase the rate at which the data may be processed. Graph FIG. 7B depicts the frequency bands as 0-3.75 Hz, 3.75-7.5 Hz, 7.5-11.25 Hz, 11.25-15 Hz, any number of different frequency bands and of any size may be selected). During each instance of the moving window, the frequency composition of the measurements within the window may be calculated. The frequency composition of a particular point in time (e.g., of the moving window) may indicate the energy detected per frequency over the period of time.

For example, at time $t_0$ the moving window may capture the frequencies of the energy (e.g., measured as a magnitude of energy) at particular value that are included in FIG. 6A between 0 and 3 seconds (or the maximum length of the window if selected to be different). At time $t_1$, the moving window may capture the frequencies of the magnitudes that are included in FIG. 7A between, for example, 0.1 seconds and 0.35 seconds. The rate at which the moving window may be used to capture frequencies (e.g., the difference between $t_0$ and $t_1$) may be configurable. For example, the moving window at $t_x$ may begin at any time after the beginning of the moving window at the previous time unit $t_{x-1}$ (e.g., for $t_1$ it may be any time after 0 such as at 0.001 seconds, 0.01 seconds, etc.) including the end of the moving window at the previous time (e.g., this may be the moving window interval or 3 seconds based on the previous example). In other words, the moving window may capture overlapping portions of the received gyroscopic data of FIG. 7A or capture only unique portions of the data (e.g., such as the case where the moving window captures 0-3 seconds then 3-6 seconds etc.).

The length of the window and the period of time, as similarly noted above, may be modified to improve the performance of a classifier model (e.g., the trained machine-learning model) to improve the accuracy and/or speed of physical interaction determination. For example, a probability of physical interaction may be determined based on a previous physical interaction determination and based on the trained machine-learning model, it may be determined that an improvement (e.g., increased accuracy or redundancy, etc.) is to be made. The modifications may include modifying a sampling rate of the gyroscopes, a sampling rate of the moving window (e.g., ensuring more instances of the moving window are used to collect data during the period of time by overlapping each instance of the moving window), increasing or decreasing the time period (e.g., to ensure appropriate amounts of data are collected for a proper inference of physical interaction determination).

The graph depicted in FIG. 7C illustrates the plot of the relative energies of the frequency bands (labeled frequency band 1 or FB1 through frequency band 4 or FB4) over time. Using the frequency composition (e.g., graph of FIG. 7B), a relative energy of each frequency band is calculated over the time period. The moving window depicted in FIG. 7C indicates the relative energy of the measured gyroscopic data in the moving window shown in FIG. 7A. The relative energies of each of the frequency bands may be input in the classifier model along with ancillary data (e.g., speed, orientation, environment values, temperature, GPS data, and/or the like). An output of the classification may indicate a probability of physical interaction with the mobile device which is further depicted in connection with FIGS. 9A and 9B below.

Figure 8:
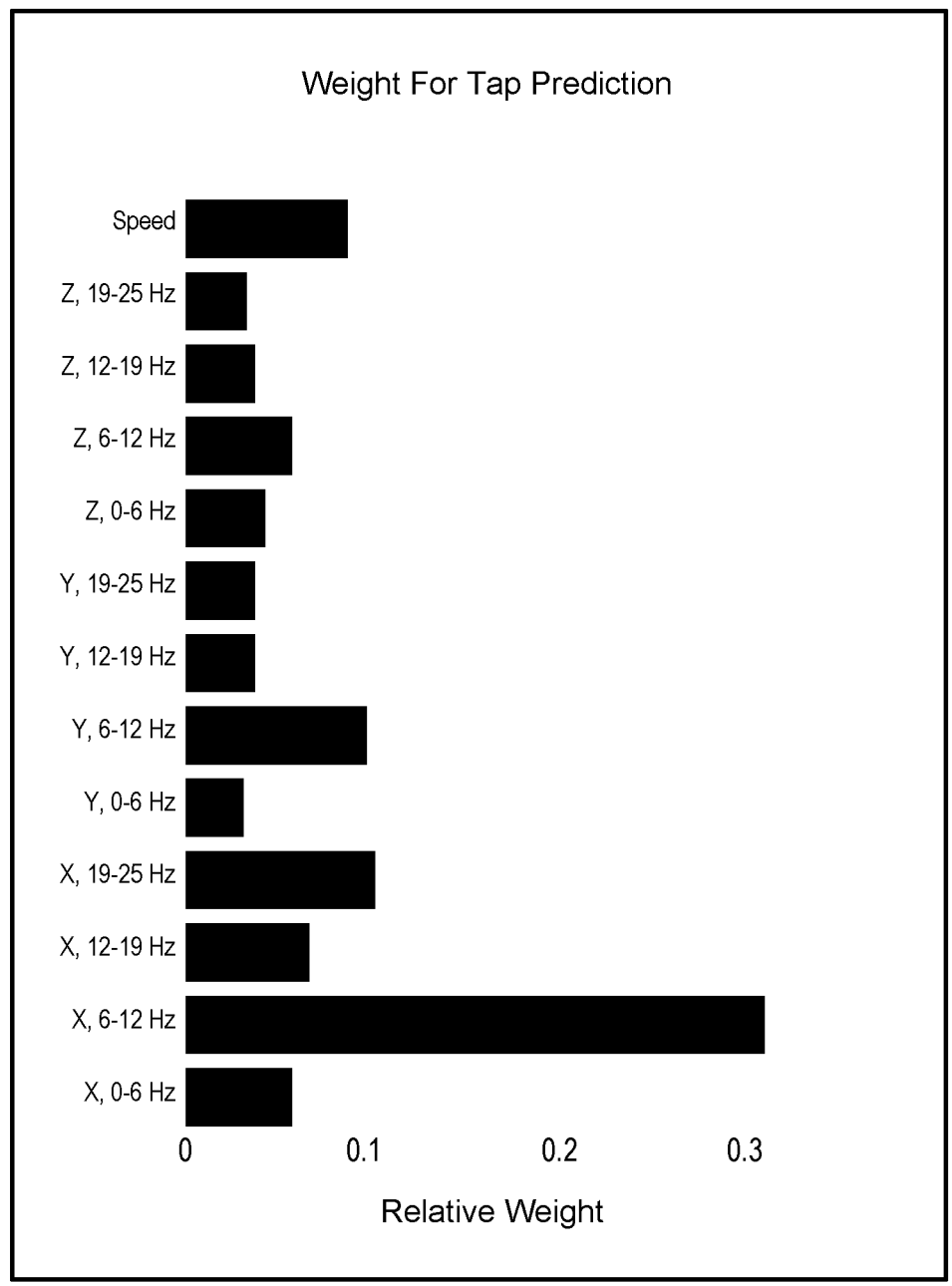
FIG. 8 is an exemplary depiction of a sample output from a classifier model according to some embodiments.

FIG. 8 is an exemplary depiction of an output of a classifier model indicating the relative weight of particular frequency bands in determining whether a physical interaction has occurred. Each frequency band is measured relative to an axis (e.g., x, y, and/or z) and weighted by the classifier model based on the frequency bands effect on making a physical interaction determination. For example, as depicted, the values in the x-axis in the 6-12 Hz band are weighted higher in determining whether a physical interaction has occurred than values in the x-axis in the 0-6 Hz. Thus, detecting a high magnitude of the energy relative to the x-axis in the 6-12 Hz band is more likely to indicate that a physical interaction has occurred than other frequency bands. The output of the classifier model may be based on factors such as, but not limited to, data used to train the classifier model, previous determinations of physical interaction, the orientation of the electronic device (e.g., upright, horizontal, lying flat, and/or any other possible orientation), surface area and/or shape of the electronic device, whether the device is in a mount or not, and/or the like. For example, the large weight of the x-axis 6-12 Hz band may be based on a mobile device that is substantially rectangular, supported in a mount, and in a vertical orientation (relative to the ground). For another example, the classifier model may weight the y-axis 6-12 Hz band higher based on a mobile device that is substantially rectangular, supported in a mount, and in a horizontal orientation (relative to the ground). The classifier model may weight any frequency band relative to any axes as the highest (and most likely to be an indication of physical interaction) based any of the factors described above.

Figure 9A:
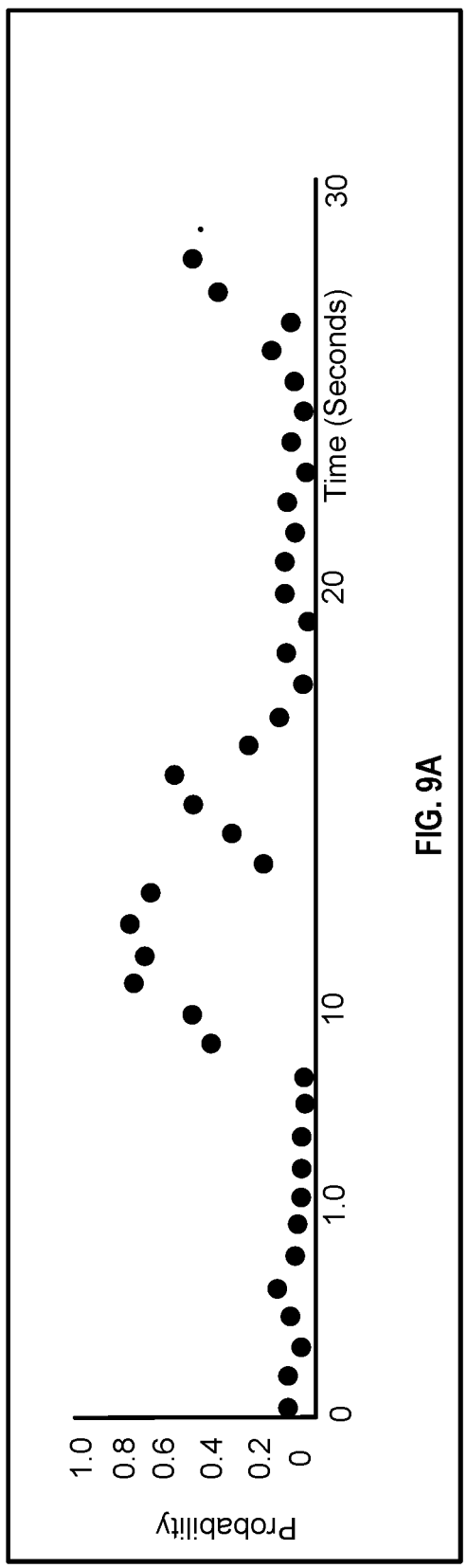
FIG. 9A is an exemplary depiction of the output of the classifier according to some embodiments.
Figure 9B:
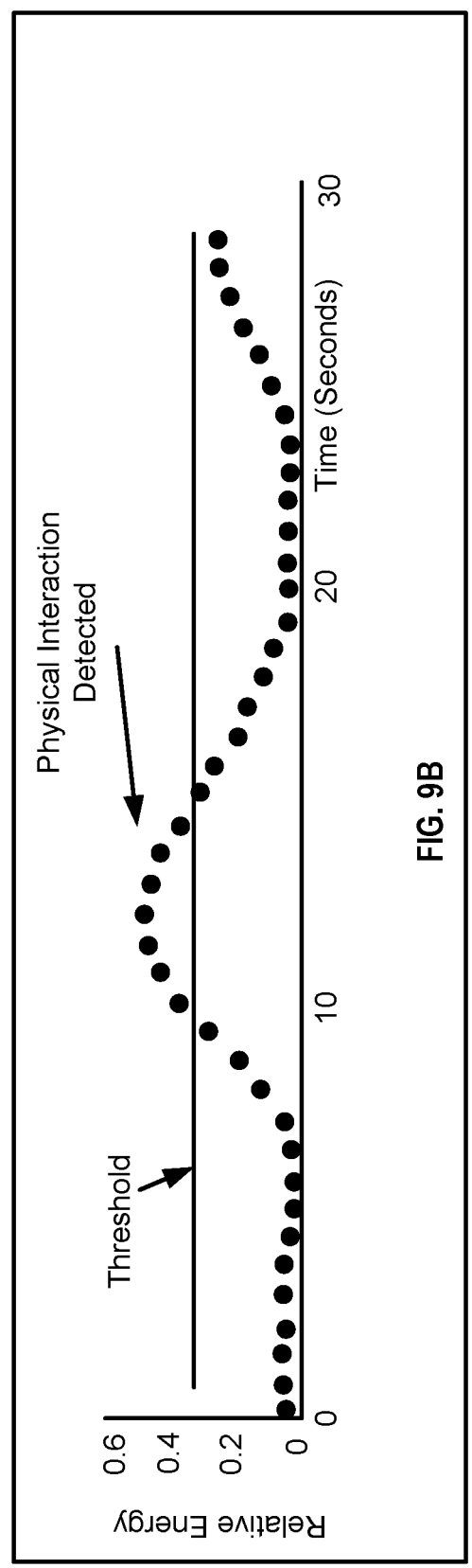
FIG. 9B is an exemplary depiction of the output of the classifier according to some embodiments.

FIG. 9A-9B is an exemplary depiction of the both raw output of the classifier (e.g., FIG. 9A) and the processed output (e.g., FIG. 9B) using the data illustrated in FIG. 7A-7C. The raw output of a physical interaction determination includes a probability value corresponding to a probability that a user is physically interacting with an electronic device. The raw probability values may vary more than an acceptable amount based on a number of factors (e.g., the environment, speed, orientation of the electronic device, sample rate of the gyroscopes, the moving window, the training data, and/or the like). Any given probability value may not provide an appropriate level of accuracy in indicating a physical interaction. The output from the classifier may be further processed by modify the probability values using a smoothing function that indicates a normalized probability.

A classifier receives as input a relative magnitude of the energy associated with each frequency band that is relative to one or more axes and ancillary data values which may include, by example only, a speed of the electronic device, the orientation of the device, whether the device is mounted or not, environmental values (temperature, humidity, sea level, etc.), GPS, and/or the like. The combination of ancillary data and the magnitudes of the energy of each frequency band relative to one or more axes enables the classifier to output one or more probability values. The classifier may output a probability value at predetermined time intervals (e.g., every 1 second, 1 millisecond, 0.1 millisecond, or any interval). A smoothing algorithm may be applied to the raw output of the classifier to provide smoothing. For example, the smoothing algorithm may be an N-second smoothing kernel. The smoothed probabilities may be used to provide a prediction of physical interaction when the smoothed probability exceeds a threshold amount (e.g., as depicted in FIG. 9, the threshold=0.35). The threshold may be predetermined and/or determined by a trained machine-learning model. For example, the threshold may be set higher or lower based on a plurality of factors including, but not limited to, those described above in relation to the position, orientation, size, speed, and/or type of the electronic device, environmental factors (e.g., GPS data, type of vehicle and/or method of transportation, etc.), classifier (e.g., trained machine-learning model), one or more previous physical interaction determinations, and/or the like.

A depicted in (e.g., FIG. 9B), a probability greater than 0.35 may provide a positive indication of physical interaction with the electronic device. The probability values that exceed the threshold line (e.g., 0.35) will trigger a positive indication of physical interaction with the electronic device. In some instances, a message may be transmitted requesting input indicating whether actual physical interaction occurred as predicted. The classifier may modify a sampling rate (e.g., of the gyroscopes, the sampling period of time, the moving window, and/or the like), one or more assigned weights (e.g., depicted in FIG. 8), the smoothing function, and/or the probability threshold, and/or the like in response to determining that the classifier's probability determination was correct or incorrect. In some instances, the probability determination may be refined (e.g., using any of the above modifications) without receiving the positive determination that the classifier was correct or incorrect. For example, each probability value output from the classifier may be further used as input to further refine the operations of the classifier and to improve the accuracy of the classifier. In some examples, the one or more additional factors (e.g., environmental values, GPS, weather, road conditions, etc.) or other data may be correlated with the gyroscopic data and speed to increase the accuracy of the physical interaction determination.

In some instances, the classifier may receive one or more constraints as input such as, for example only, the electronic device is in particular orientation, a speed of the electronic device, GPS values, environmental values, and/or the like in order for the classifier to provide a probability in which a user is physical interacting with the electronic device given the one or more constraints. In other words, a vertical configuration may be input as a constraint to the classifier and the classifier may return a probability in which user is interacting with the electronic device when the electronic device is in the mounted vertically. The constraints may be used to qualify the physical interaction determination to particular contexts. For example, the classifier may determine a high probability of physical interaction when the speed of the electronic device is zero and not trigger an output or response. If the classifier determines a high probability of physical interaction when the speed of the electronic device is 40 miles per hour, a high probability of distracted driving may be indicated. An action may be triggered as a result to limit the possibility of distract driving. The action may include, but is not limited to, an audible alert or vibration, transmitting a message to a remote device, disabling the electronic device or a component thereof (e.g., the screen), disabling input to the electronic device, disabling an application that is in-use, and/or the like. Any constraint and/or number of constraints may be input to the classifier to qualify a context that must occur in order along with the probability of physical interaction with the electronic device without departing with the spirit or scope of the present disclosure.

Figure 10:
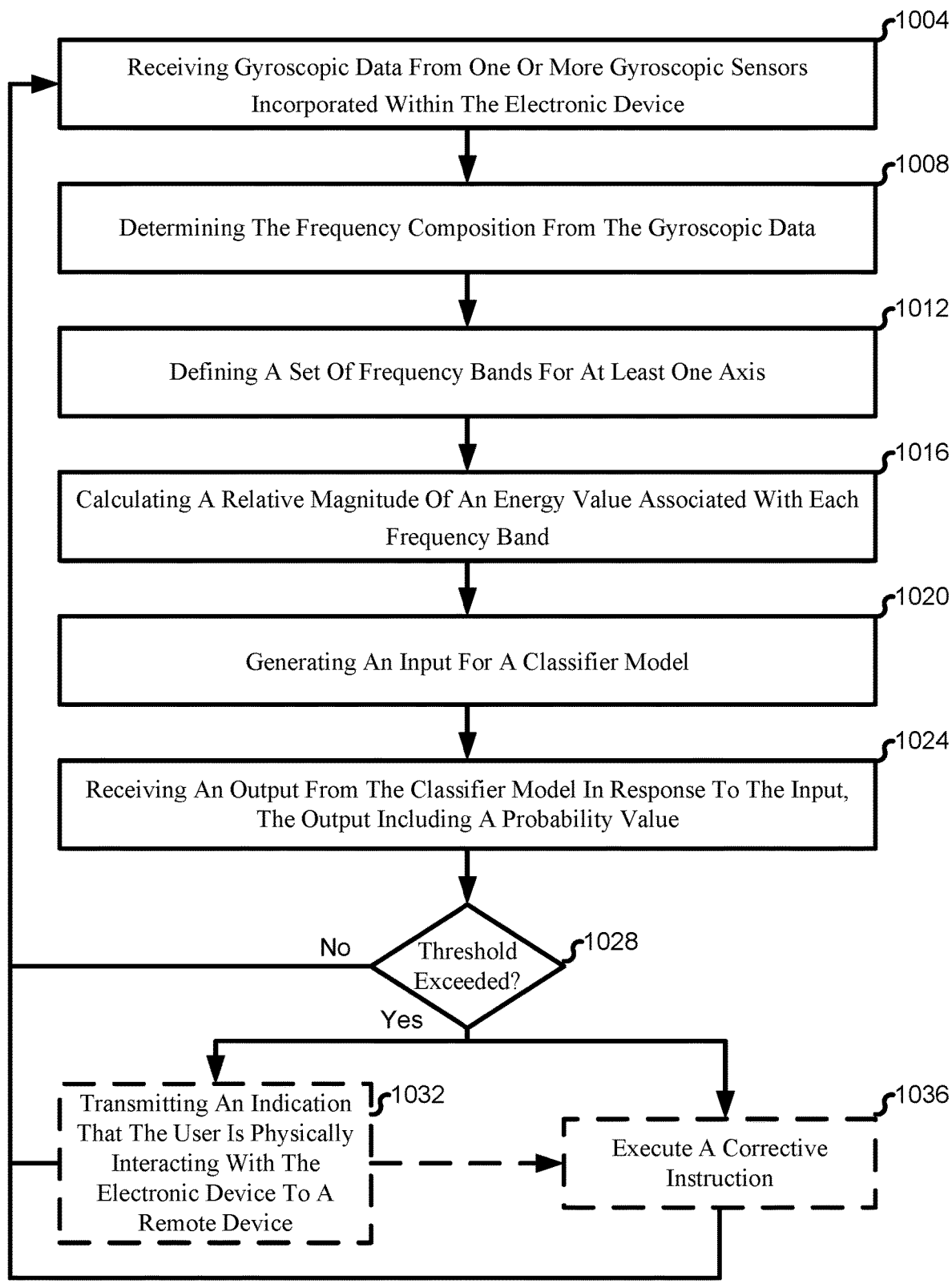
FIG. 10 is an exemplary flowchart depicting a process for detecting physical interaction with an electronic device according to some embodiments.

FIG. 10 depicts an exemplary process for detecting physical interaction with an electronic device (such as a smartphone) during an event (such as, for example, operating a vehicle). The process begins at block 1004 in which gyroscopic data may be received by one or more gyroscopic sensors within the electronic device. The gyroscopic data may include a set of values (e.g., of a magnitude of angular velocity) corresponding to measurements received from the one or more gyroscopes. The gyroscopic data may augmented with additional data including a speed measurement, a position of the electronic device, an orientation of the electronic device, a type of the electronic device, a surface area and/or volume of the electronic device, a weight of the electronic device, GPS data, a type of vehicle (e.g., automobile, train, plane, etc.), and or the like. Each value of the set of values may be relative to one or more axis of a plurality of axes (e.g., the axis depicted in FIG. 4). In some examples, each gyroscope of the one or more gyroscopes measures values relative to an axis of the plurality of axes (e.g., x, y, or z). In other examples, each gyroscope measures values relative to each (or a combination) of a plurality of axes (e.g., x, y, and/or z).

The gyroscopic data may be received and/or collected over time. For example, the gyroscopic data may be collected over a predetermined period of time (e.g., any period selected by a user, determined by a machine-learning model, and/or by one or more previous physical interaction determinations). The gyroscopic data may be streamed (e.g., each value received as it is measured), received in batches, or received at f A moving window for which the opening of the window occurs when the gyroscopic data is first collected (e.g., $t_0$) may be used to initialize processing portions of the gyroscopic data (e.g., in connection with blocks 1008 and 1012 described more fully below). The window may be any size and selected in a similar manner as the predetermined period of time.

At block 1008, a frequency composition may be calculated for the gyroscopic data. For example, one or more frequency transforms (e.g., Laplace, Fourier, etc.) may be used to convert the gyroscopic data from the time domain to a frequency domain. The frequency domain may indicate the frequency in which particular angular velocity measurements of the gyroscope were included in the gyroscopic data. In some examples, the frequency may be determined by a moving window that is used to sample the gyroscopic data. The moving window represents a subset of the set of values that exist within the predetermined period of time. The moving window may be of a predefined length that may be modified based on user input, a trained machine-learning model, and/or one or more previous physical interaction determinations (e.g., to increase or decrease a sampling rate). Each instance of the moving window may be used to identify the frequency of values that occur within the window. The moving window may move in real-time such that the frequency analysis also occurs in real-time. The moving window may define the frequency of a set of values at particular points in time. In some examples, a Fourier or Laplace transform may be used to translate a set of gyroscopic data in the time domain into the frequency domain and to identify the frequencies of each value.

At block, 1012, a set of frequency bands may be defined relative to an axis of the plurality of axes. The frequency bands may be defined by subtracting a highest frequency and a lowest frequency and dividing the result by an integer. Any number of frequency bands may be defined (e.g., by modifying the integer). Each frequency band may be relative to particular axis such that each frequency band may represented multiple times, with each instance of the frequency band being relative to a different axis. For example, the frequency band 6-12 Hz may be represented three times in the set of frequency bands where the first instance of 6-12 Hz may include values relative to the x-axis, the second instance of 6-12 Hz may include values relative to the y-axis, and the third instance of 6-12 Hz may include values relative to the z-axis. In some examples, a frequency band may exist relative to the x-axis and not have a corresponding instance of the frequency band relative to the y-axis. The frequency bands may be modified to be smaller (e.g., each frequency band representing a smaller portion of the gyroscopic data) or larger based on user input, a trained machine-learning model, and/or previous physical interaction determinations.

At block 1016, a magnitude of an energy value (e.g., the angular velocity measurement) of each frequency band may be calculated. Each frequency band may use the magnitude of the energy value as a single value for the frequency band to be provided to the classifier. The single value may be a sum total, an average, a sample of the values of the frequency composition associated with the frequency band, and/or the like.

At block 1020, an input may be generated for a classifier model. The input may include the magnitude associated with each frequency band as well as ancillary data values. The ancillary data values may include, but are not limited to, an orientation, size, shape, and/or type of the electronic device, a type of vehicle associated with a speed in which the electronic device is moving, environmental factors include GPS data, and/or the like. The input to the classifier may be used to provide one or more probability values each providing an indication of the probability in which a user is physically interacting with the electronic device. The classifier may one, some, or all of the data values input to determine a probability. For example, the input may include 12 frequency bands (four bands per axis with three axes) and the ancillary data values may include GPS and speed values. The classifier may use one or two of the frequency bands and not the remaining ten to eleven. In some instances, the ancillary data values may cause the classifier to rely on more or less frequency bands. For example, the ancillary data values may include speed values and an indication that the electronic device is mounted in a vertical orientation to determine that values corresponding to one frequency band may provide a probability of physical interaction with greater accuracy than the other eleven frequency bands. The data relied on to form a probability determination along with the results may be used refine the classifier model to increase the accuracy of future physical interaction determinations (e.g., by providing better data correlations).

At block 1024, the classifier model outputs a probability value corresponding to a probability that a physical interaction with a mobile device is occurring. The classifier model may provide the determination in real-time (e.g., at the moment the physical interaction is occurring) or at a later time as part of a batch process. In some instances, the gyroscopic data may be sent to a server device in which the operations of 1004-1032 may be executed by the server device.

At block 1028, the probability value may be compared to a threshold. If the threshold is exceeded, then an indication of physical interaction may be determined. The threshold may be modified based on user input, the classifier, and/or one or more previous physical interaction determinations. For example, a previous physical interaction determination may have incorrectly determine physical interaction at a first threshold causing subsequent physical interaction determinations to have a higher threshold to determine a positive physical interaction determination. If the threshold is not exceeded, then the process may return to step 1004 in which new gyroscopic data set may be received over the predetermined period of time (or over a new predetermined period of time) and the process may repeat.

In response to the threshold being exceeded, the process will continue to block 1032 or block 1306. For example, at block 1032 the indication of a user physically interacting with (e.g., tapping) the electronic device may be transmitted to a remote device. The positive indication of physical interaction with the electronic device may be further correlated with other factors such as, but not limited to, whether a user of the device was an occupant of a vehicle or operating the vehicle as a driver. The correlation with the other factors may provide an indication that the user was physically interacting with the electronic device while operating (e.g., driving) the vehicle. The electronic device may additionally transmit the indication that the user was operating a vehicle at the time to a remote device. In some instances, after transmitting the indication that user is physically interacting with the electronic device to the remote device, the process may return to step 1004 and wait for an updated set of gyroscopic data. Alternatively, the remote device may transmit a corrective command to the electronic device in which case the process may pass to block 1036 where the electronic device execute the corrective command.

At block 1036, one or more actions may be executed by a processor of the electronic device. The actions may be triggered by the detection of physical interaction by the electronic device (e.g., continuing the process from block 1028) or from an instructions received from a remote device in response transmitting an indication of physical interaction (e.g., continuing the process from block 1032). The action may be automatically executed or executed in response to receiving instructions from the remote device or in response to a determination that physical interaction of the electronic device has occurred. The one or more actions may include, but are not limited to, disabling a feature of the electronic device, disabling and input source of the electronic device, displaying a warning on the electronic device, toggling the electronic device to power off, increasing a sampling rate of one or more future physical interaction determinations (e.g., locally or remotely), modifying the probability threshold (e.g., to be more sensitive and trigger subsequent positive physical interaction indications with a lower probability), modifying the predetermined period of time or the moving window, tracking the type of physical interaction, correlating the physical interaction with other data such as (but not limited to) GPS data, modifying a policy associated with the user (the electronic device, and/or vehicle), and/or the like.

For example, upon detecting physical interaction, the electronic device may transmit an indication that physical interaction has been detected to a server. The server, in response to receiving the indication, may transmit a command to the electronic device that causes the electronic device to vibrate and/or emit an audible alert each time subsequent indications of physical interaction is detected. In some instances, the electronic device may notify the server that the vibration/alerts have not reduced or eliminated physical interactions with the electronic device. This may cause the server to take more severe corrective action such as remotely disabling an application or input interface of the electronic device or the electronic device itself for a predetermined period of time.

In some examples, one or more future physical interaction determinations may be modified to make the detecting the physical interaction determination more sensitive (e.g., trigger with less physical interaction). The relative weights of each frequency band (e.g., as shown and described in connection to FIG. 8), the number of frequency bands, the moving window and/or the predetermined time period, the probability threshold, the smoothing function, etc. may be updated upon every physical interaction determination regardless as to whether a physical interaction has been detected or not. For example, upon detecting a high probability of physical interaction determination that exceeds the threshold, the classifier may modify the relative importance of one or more frequency bands (e.g., whether the frequency band is more likely or less likely to be a contributor to the indication of physical interaction) that may be used to determine whether a subsequent physical interaction with the electronic device has occurred.

In another example, the classifier model may modify the probability threshold for subsequent physical interaction detections upon detecting an initial physical interaction with the electronic device. The physical interaction determination may cause the classifier to lower the probability threshold for a predetermined period of time given that it may be more likely for a user who has interacted with the electronic device once to do so again soon thereafter. The classifier may use subsequent physical interaction determinations that occur within the predetermined period of time to further refine the classifier and/or the length of the predetermined period of time.

Any number and/or type of actions may be executed in response to a positive indication of physical interaction with the electronic device without departing from the spirit or scope of the present disclosure. Once the indication is transmitted (and/or an action is executed) the process may return to block 1004 to process a new set of gyroscopic data or if nor more data is received (or the electronic device has stopped moving) the process may terminate.

The operations of FIG. 10 may be executed by the mobile device (e.g., the driver's mobile device), another mobile device, or by a remote device. For example, the driver's mobile device may detect the indication of manual interaction with the mobile device in real-time and report execute the one or more actions or otherwise report the indication to a remote device. In another example, the driver's mobile device may collect the gyroscopic and ancillary data and transmit the data to a remote device that may detect the indication of manual interaction. In that example, the detection of manual interaction with the mobile device may occur in real-time (e.g., the data may be streamed to the remote device in real-time enabling such as detection) or the data may be received and processed at later date. For example, the data may be received over a period of a specified duration (e.g., 55 days) and processed after the period of the specified duration expires to determine a number of indications of manual interaction that occurred during the period of the specified duration.

Specific details are given in the above description to provide a thorough understanding of the embodiments and examples. However, it is understood that the embodiments and/or examples described above may be practiced without these specific details. For example, well-known circuits, processes, algorithms, structures, and techniques may be shown without unnecessary detail in order to avoid obscuring the embodiments and/or examples.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein the term "memory" refers to any type of volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices and/or other machine readable mediums for storing information. The term "computer-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of detecting physical interaction with a mounted electronic device, the method comprising:
receiving gyroscopic data from one or more gyroscopic sensors incorporated within the electronic device, the gyroscopic data including a set of values corresponding to measurements output from each of the one or more gyroscopic sensors, each measurement being relative to at least one axis of a plurality of axes;

determining a frequency composition from the set of values for at least one axis of the plurality of axes;

defining a set of frequency bands for the at least one axis of the plurality of axes based on the frequency composition, wherein each frequency band of the set of frequency bands represents a portion of the frequency composition;

calculating, for each frequency band of the set of frequency bands, a relative magnitude of an energy value associated with the portion of the frequency composition represented by the frequency band;

generating an input for a classifier model, the input including the relative magnitude corresponding to each frequency band of the set of frequency bands and one or more ancillary data values;

receiving an output from the classifier model in response to the input, the output including a probability value indicating a probability that a user is physically interacting with the electronic device;

determining that the probability value exceeds a threshold; and transmitting, in response to determining that the probability value exceeds the threshold, an indication that the user is physically interacting with the electronic device to a remote device.

2. The method of claim 1, wherein the gyroscopic data includes measurements output from the one or more gyroscopic sensors over time period of a specified duration.

3. The method of claim 1, further comprising:
increasing a sampling rate of measurements output from each of the one or more gyroscopic sensors in response to determining that the probability value exceeds the threshold.

4. The method of claim 1, further comprising:
generating a warning communication for display by the electronic device in response to determining that the probability value exceeds the threshold.

5. The method of claim 1, further comprising:
receiving, from the remote device, one or more instructions in response to transmitting the indication that the user is physically interacting with the electronic device; and
executing the one or more instructions using a processor of electronic device.

6. The method of claim 1, wherein the one or more ancillary data values includes a speed of the electronic device.

7. The method of claim 1, further comprising:
smoothing the output by modifying one or more data values of the output.

8. A system for detecting physical interaction with a mounted electronic device, the system comprising:
one or more processors; and
a non-transitory computer-readable medium storing instructions which when executed by the one or more processors, cause the one or more processors to perform operations including:
receiving gyroscopic data from one or more gyroscopic sensors incorporated within the electronic device, the gyroscopic data including a set of values corresponding to measurements output from each of the one or more gyroscopic sensors, each measurement being relative to at least one axis of a plurality of axes;

determining a frequency composition from the set of values for at least one axis of the plurality of axes;

defining a set of frequency bands for the at least one axis of the plurality of axes based on the frequency composition, wherein each frequency band of the set of frequency bands represents a portion of the frequency composition;

calculating, for each frequency band of the set of frequency bands, a relative magnitude of an energy value associated with the portion of the frequency composition represented by the frequency band;

generating an input for a classifier model, the input including the relative magnitude corresponding to each frequency band of the set of frequency bands and one or more ancillary data values;

receiving an output from the classifier model in response to the input, the output including a probability value indicating a probability that a user is physically interacting with the electronic device;

determining that the probability value exceeds a threshold; and transmitting, in response to determining that the probability value exceeds the threshold, an indication that the user is physically interacting with the electronic device to a remote device.

9. The system of claim 8, wherein the gyroscopic data include measurements output from the one or more gyroscopic sensors over time period of a specified duration.

10. The system of claim 8, wherein the operations further include increasing a sampling rate of measurements output from each of the one or more gyroscopic sensors.

11. The system of claim 8, further comprising generating a warning communication for display by the electronic device in response to determining that the probability value exceeds the threshold.

12. The system of claim 8, wherein the operations further include:
receiving, from the remote device, one or more instructions in response to transmitting the indication that the user is physically interacting with the electronic device; and
executing the one or more instructions using a processor of electronic device.

13. The system of claim 8, wherein the one or more ancillary data values includes a speed of the electronic device.

14. The system of claim 8, smoothing the output to remove one or more outlier data values of the output.

15. A non-transitory computer-readable medium storing instructions which when executed by one or more processors, cause the one or more processors to perform operations including:
receiving gyroscopic data from one or more gyroscopic sensors incorporated within an electronic device, the gyroscopic data including a set of values corresponding to measurements output from each of the one or more gyroscopic sensors, each measurement being relative to at least one axis of a plurality of axes;

determining a frequency composition from the set of values for at least one axis of the plurality of axes;

defining a set of frequency bands for the at least one axis of the plurality of axes based on the frequency composition, wherein each frequency band of the set of frequency bands represents a portion of the frequency composition;

calculating, for each frequency band of the set of frequency bands, a relative magnitude of an energy value associated with the portion of the frequency composition represented by the frequency band;

generating an input for a classifier model, the input including the relative magnitude corresponding to each frequency band of the set of frequency bands and one or more ancillary data values;

receiving an output from the classifier model in response to the input, the output including a probability value indicating a probability that a user is physically interacting with the electronic device;

determining that the probability value exceeds a threshold; and transmitting, in response to determining that the probability value exceeds the threshold, an indication that the user is physically interacting with the electronic device to a remote device.

16. The non-transitory computer-readable medium of claim 15, wherein the gyroscopic data include measurements output from the one or more gyroscopic sensors over time period of a specified duration.

17. The non-transitory computer-readable medium of claim 15, wherein the operations further include increasing a sampling rate of measurements output from each of the one or more gyroscopic sensors.

18. The non-transitory computer-readable medium of claim 15, further comprising generating a warning communication for display by the electronic device in response to determining that the probability value exceeds the threshold.

19. The non-transitory computer-readable medium of claim 15, wherein the operations further include:

receiving, from the remote device, one or more instructions in response to transmitting the indication that the user is physically interacting with the electronic device; and executing the one or more instructions using a processor of electronic device.

20. The non-transitory computer-readable medium of claim 15, wherein the one or more ancillary data values includes a speed of the electronic device.

21. A method of detecting physical interaction with an electronic device, the method comprising:

receiving gyroscopic data from one or more gyroscopic sensors incorporated within the electronic device, the gyroscopic data including a set of values corresponding to measurements output from each of the one or more gyroscopic sensors, each measurement being relative to at least one axis of a plurality of axes;

determining a frequency composition from the set of values for at least one of the plurality of axes;

defining a set of frequency bands for the at least one axis of the plurality of axes based on the frequency composition, wherein each frequency band of the set of frequency bands represents a portion of the frequency composition;

calculating, for each frequency band of the set of frequency bands, a relative magnitude of an energy value associated with the portion of the frequency composition represented by the frequency band;

generating an input for a classifier model, the input including the relative magnitude corresponding to each frequency band of the set of frequency bands and one or more ancillary data values;

receiving an output from the classifier model in response to the input, the output including a probability value indicating a probability that a user is physically interacting with the electronic device;

determining that the probability value exceeds a threshold; and transmitting, in response to determining that the probability value exceeds the threshold, an indication that the user is physically interacting with the electronic device to a remote device;

receiving, from the remote device, a command to modify the electronic device in response to transmitting the indication; and executing the command to modify the electronic device, the modification including increasing a sampling rate of at least one gyroscope of the one or more gyroscope sensors.

* * * * *